United States Patent [19]

Freudenberg et al.

[11] Patent Number: 5,356,122
[45] Date of Patent: Oct. 18, 1994

[54] HYDRAULICALLY DAMPED BEARING FOR A PISTON ENGINE HAVING A RELIEF VALVE FOR INSULATING ENGINE IDLING VIBRATIONS

[75] Inventors: Ulrich Freudenberg, Hirschberg; Tillman Freudenberg, Weinheim, both of Fed. Rep. of Germany

[73] Assignee: Firma Carl Freudenberg, Weinheim, Fed. Rep. of Germany

[21] Appl. No.: 818,735

[22] Filed: Jan. 7, 1992

Related U.S. Application Data

[63] Continuation of Ser. No. 561,705, Aug. 2, 1990, abandoned.

[30] Foreign Application Priority Data

Aug. 3, 1989 [DE] Fed. Rep. of Germany ....... 3925712

[51] Int. Cl.$^5$ .............................................. F16M 5/00
[52] U.S. Cl. .................................................. 267/140.13
[58] Field of Search ........... 267/140.1 A, 219, 140.13, 267/140.14; 180/300, 312, 902; 248/562, 636

[56] References Cited

U.S. PATENT DOCUMENTS

| | | | |
|---|---|---|---|
| 4,583,503 | 4/1986 | Kumagai et al. | 248/636 X |
| 4,699,099 | 10/1987 | Arai et al. | 180/312 X |
| 4,709,779 | 12/1987 | Takehara | 180/300 |
| 4,867,263 | 9/1989 | Sugino et al. | 180/312 X |
| 4,872,652 | 10/1989 | Rohner et al. | 267/140.1 |

FOREIGN PATENT DOCUMENTS

| | | | |
|---|---|---|---|
| 3619685 | 12/1987 | Fed. Rep. of Germany . | |
| 93537 | 5/1984 | Japan | 267/140.1 A |
| 146628 | 7/1986 | Japan | 180/300 |

OTHER PUBLICATIONS

Theory Of The Hydro-Bearing, Spurk/Andrä Automobile Industry, May 1985, p. 554.

*Primary Examiner*—Robert J. Oberleitner
*Attorney, Agent, or Firm*—Kenyon & Kenyon

[57] ABSTRACT

A hydraulically damped bearing for a piston engine has a liquid-filled working chamber that communicates with the compensating chamber by means of a duct-type conduit. The effective length of the conduit can be shortened by arbitrarily actuating a relief valve, which is arranged between the outlets of the conduit that communicate with the working and compensating chambers. The respective distances between the valve and the outlets are dimensioned so that the liquid volume contained in the linear section defining the effective length L of the conduit vibrates essentially in phase with the bearing member when vibrations of a frequency corresponding to the idling speed are introduced.

16 Claims, 2 Drawing Sheets

HYDRAULICALLY DAMPED BEARING FOR A PISTON ENGINE HAVING A RELIEF VALVE FOR INSULATING ENGINE IDLING VIBRATIONS

This application is a continuation of application Ser. No. 07/561,705, filed Aug. 2, 1990, now abandoned.

BACKGROUND OF THE INVENTION

The invention relates generally to hydraulically damped bearings for supporting a piston engine, for example, and, more particularly, to a hydraulically damped bearing having an improved ability to insulate vibrations emanating from the engine when the idling speed of the engine is reached.

A hydraulically damped bearing for a piston engine having a liquid-filled working chamber defined by a journal bearing, a bearing member, and a rubber-elastic spring element connected therebetween is disclosed in DE-OS 36 19 685. A compensating chamber bounded by a flexible inner wall communicates with the working chamber by means of a duct-type conduit. The conduit and the expanding elasticity of the spring element cooperate with each other such that when vibrations of an arbitrarily specified frequency are introduced into the bearing member, the liquid volume in the conduit attains a resonant movement. The effective length of the conduit can be shortened by a selectively operable relief valve mounted in the inner side wall of the conduit between the ends of the conduit, which communicate with the working and compensating chambers, respectively. The effective length of the conduit is arbitrarily increased and decreased by activating the valve to attain a damping effect based on resonant effects in the widest possible frequency range. The ability of this type of bearing to insulate vibrations that occur at the idling speed of the piston engine supported thereby is less than satisfactory as such vibrations become noticeable in the automobile body.

Thus, one of the problems to which the invention is directed is to further develop a bearing of the general type discussed above to effectively damp the low-frequency vibrations occurring when a motor vehicle containing an engine supported by the bearing travels over a road and to efficiently insulate vibrations emanating from the piston engine when the idling speed thereof is reached.

SUMMARY OF THE INVENTION

The invention solves this problem by providing a hydraulically damped bearing for supporting a piston engine having a liquid-filled working chamber defined by a journal bearing, a bearing member and an elastic spring element. The elastic spring element is connected between the bearing member and the journal bearing such that a predetermined displacement cross-section of the spring element is movable relative to the journal bearing. A compensating chamber is bounded at one end by a flexible inner wall. A conduit is provided having a cross-sectional flow area, a first outlet communicating with the working chamber, and a second outlet spaced from the first outlet communicating with the compensating chamber. The conduit cooperates with the expanding elasticity of the spring element such that when vibrations of an arbitrarily specified frequency are introduced into the bearing member, the liquid volume in the conduit attains a resonant movement. A selectively operable relief valve is mounted between the outlets in an inner side wall of the conduit. The relief valve communicates with the conduit and one of the working and compensating chambers, and has an open position defining an effective length of the conduit that is shorter than the effective conduit length when the relief valve is in its closed position. The relief valve is positioned between the outlets such that the liquid volume contained in a linear section of the conduit defining the effective conduit length when the relief valve is open is set into a relative movement that vibrates essentially in phase with the bearing member when vibrations of a frequency corresponding to an idling speed of the piston engine are introduced into the bearing member. The relative movement of the liquid volume has an amplitude that is greater than the amplitude of the bearing member, multiplied by the ratio of the displacement cross-section of the spring element and the cross-sectional flow area of the conduit.

Thus, in the bearing of the invention, the distance provided between the relief valve and the outlets is dimensioned such that the liquid volume contained in the linear section defining the effective length of the conduit is set into a relative movement that is essentially in phase with the bearing member when vibrations of a frequency corresponding to the idling speed of the engine are introduced into the bearing member. The movement of the liquid volume has an amplitude that is greater than the amplitude of the bearing member, multiplied by the ratio between the displacement cross-section of the spring element and the cross-sectional flow area of the conduit. (The displacement cross-section of the spring element refers to that surface area of the spring element that is active in the manner of a piston when the bearing member is deflected upwardly or downwardly.) As a result, the dynamic rigidity of the bearing is less when the idling speed is reached than when the motor is at standstill. This provides excellent insulation of the vibratory movements emanating from the piston engine at the idling speed. When the idling operating condition is reached, there is no fear of an increase in vibrational movement of the motor due to a resonance effect. Thus, in no way is the operational reliability of the bearing jeopardized.

An article by Spurk/Andrä entitled "Theory of the Hydro-Bearing", published in *Automobile Industry*, May 1985, discloses at illustration 3, page 554, that the dynamic rigidity of hydraulically damped motor bearings of the type discussed above drops below the resonant frequency of the liquid volume contained in the conduit. However, there is no suggestion in this article that the effect may be utilized for attaining good insulation of the vibrations caused by idling of the engine.

The invention selectively utilizes this effect and makes an adjustment when the idling speed of the supported piston engine is reached, so that the bearing supporting the piston engine has the greatest possible elasticity.

As far as the specific design of the invention is concerned, it is immaterial whether the relief valve is mounted in the working chamber or in the compensating chamber, because, independent of the particular design, the active length of the conduit is always shortened after a valve actuation. However, the outlet of the conduit that discharges into the same chamber as the relief valve should have a narrower cross-sectional flow area than that of the relief valve to ensure a damping action over a broader range of frequencies when the relief valve is closed. This is advantageous, for example, in suppressing strong movements of the piston engine above the idling speed.

The remaining regions of the conduit should have a cross-sectional flow area of at least 100 mm². It should be noted at this point that the mass action of the conduit may be characterized by the formula $$\omega_0 \times L / A$$

where $\omega_0$ signifies the density of the liquid contained in the conduit, L the length of the conduit, and A the cross-sectional area of the conduit. Thus, in connection with the expanding elasticity of the spring element and its hydraulic displacement cross-section, it is possible in principle to make equivalent adjustments to a specific frequency by using a conduit of long length and large cross-section or of short length and small cross-section. Included within the scope of the invention is a conduit that preferably has a cross-section that is as large as possible when considering structural constraints. In this manner, when vibrations are introduced into the bearing member, increased liquid volumes, which are considerable compared to those in customary bearings and which have a comparatively diminished speed, are displaced back and forth. On the one hand, this necessitates a clear definition of the resonance rise of the liquid movement in case of resonance and, on the other hand, necessitates a lowering of the dynamic spring rigidity in the frequency range below the resonant frequency. Looked at from this standpoint, it has proven expedient to provide the conduit with a cross-section of at least 100 mm².

The relief valve should have a cross-section that is at least as large as the cross-section of the conduit. In this manner, the valve does not further inhibit the relative movement of the liquid passing therethrough.

Further features, advantages, and embodiments of the invention are apparent from consideration of the following detailed description, drawings, and appended claims.

DETAILED DESCRIPTION

Figure 1:
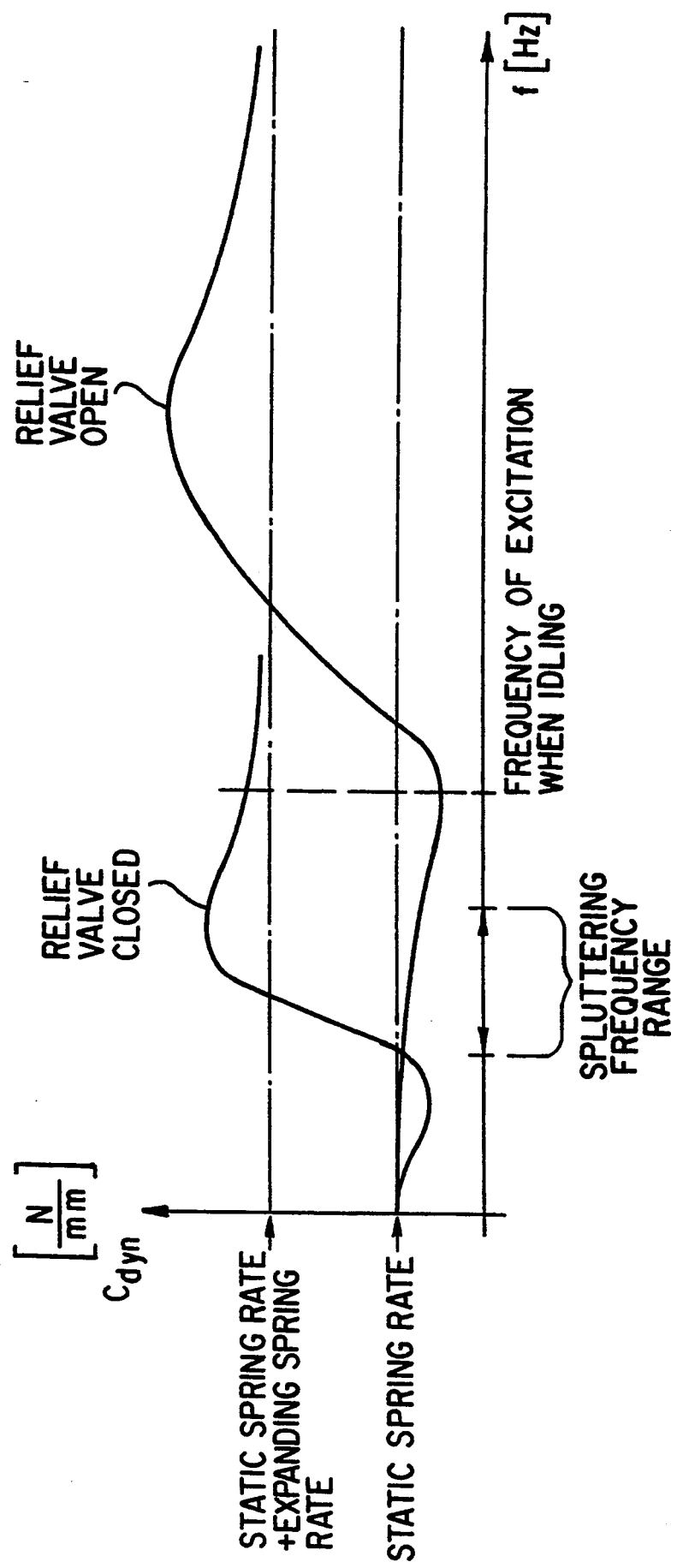
FIG. 1 is a graph in which the dynamic rigidity of a hydraulically damped bearing constructed according to the principles of the invention is plotted over frequency.

In the graph shown in FIG. 1, the dynamic rigidity of a hydraulically damped bearing of the invention is plotted over the frequency of the vibrations introduced under normal operating conditions. The graph illustrates two curves. The leftmost curve in FIG. 1 represents the performance of the bearing when the relief valve is closed. A stiff damping system thereby results in the range of the spluttering frequencies of the engine, which are discussed in more detail subsequently. By opening the relief valve, the rightmost curve is provided, which has moved to such higher frequencies that the minimum rigidity of the bearing now coincides with the frequencies of excitation of the system encountered in the idling state of the supported piston engine. As a result, the motor bearing of the invention has a particularly great flexibility and elasticity when the idling speed is reached and thereby optimum isolation of the vibratory movements of the piston engine is achieved in the idling state.

Figure 2:
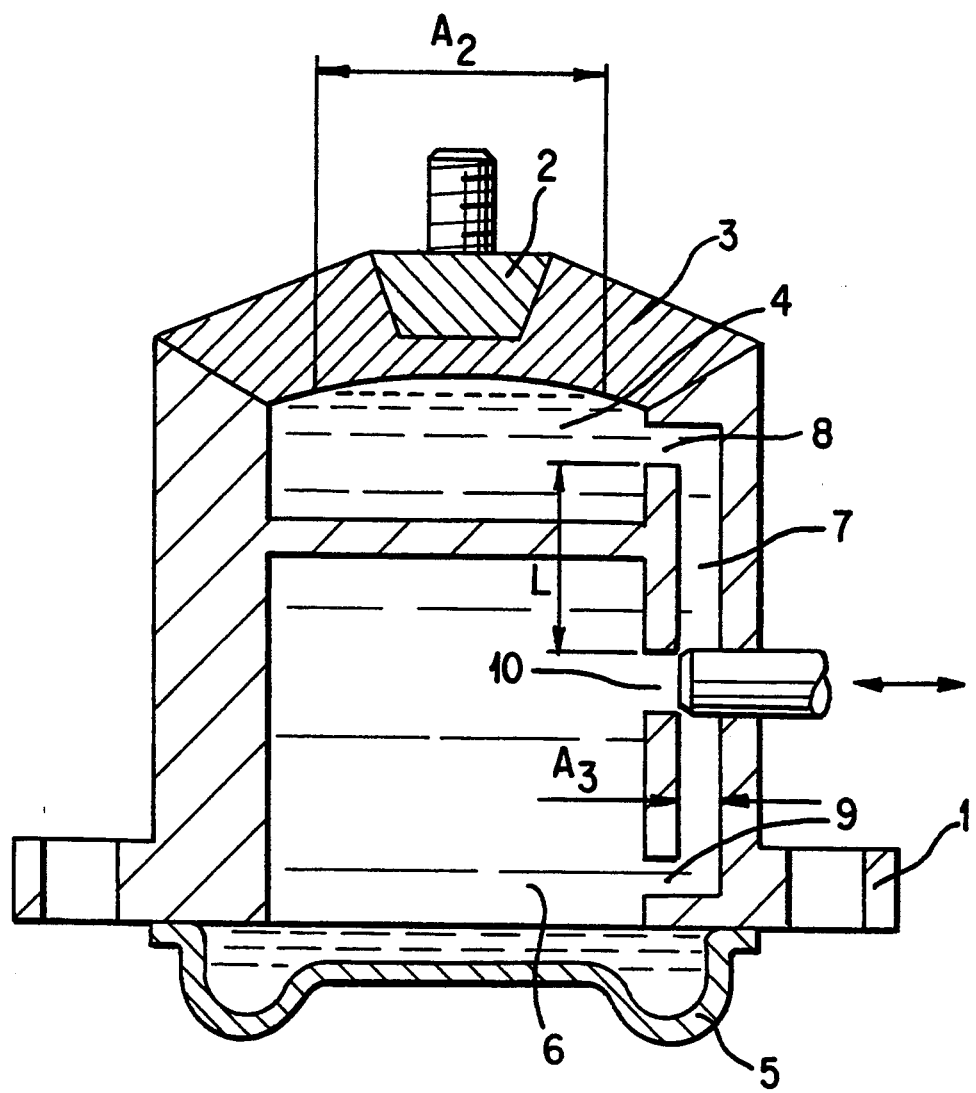
FIG. 2 is a longitudinal cross-sectional view of a hydraulically damped bearing constructed according to the principles of the invention.

In FIG. 2, a hydraulically damped bearing constructed according to the principles of the invention is illustrated in longitudinal cross-section. This bearing is intended to be used in the bearing arrangement of a piston engine in a motor vehicle. The bearing comprises a liquid-filled working chamber 4, which is defined by a journal bearing 1, a bearing member 2 and a rubber or elastic spring element 3 connected therebetween, and a compensating chamber 6 bounded by a flexible inner wall 5. Compensating chamber 6 communicates with the working chamber 4 by means of a duct-type conduit 7. The effective length 11 of the conduit 7 can be shortened by a selectively operable relief valve 10 mounted in the inner side wall of conduit 7 at a distance spaced from the outlets 8, 9 provided at the ends of the conduit. Outlets 8, 9 communicate with the working and compensating chambers, respectively. The dimensions of the conduit are selected in such a way that the effective length of the conduit cooperates with the expanding elasticity of the spring element 3, so that when vibrations are introduced into the bearing member that require damping, the liquid volume in the conduit attains a resonant movement that is essentially in phase opposition with the relative movements of the bearing member. Vibrations of this type are usually called spluttering movements and they occur preferably, in dependence upon the operating performance and weight of the respective piston engine, only at a completely specific frequency. One skilled in the art does not have any difficulty in adapting the related requirements to achieve this effect, which is described in detail in the Spurk/Andrä article previously discussed.

The bearing shown in FIG. 2, however, departs from that which is known as the distances between the relief valve 10 and the outlets 8, 9 are selected so that the liquid volume contained in the linear section defining the effective length L of the conduit is set into a relative movement that is essentially in phase with the bearing member 2 when vibrations of a frequency corresponding to the idling speed of the piston engine are introduced into the bearing member 2. Here, the relative movement has an amplitude that is greater than the amplitude of the bearing member 2, multiplied by the ratio between the displacement cross-section A2 of the spring element 3 and the cross-section A3 of the conduit 7. When the idling speed is reached, the piston engine is supported through this means on a spring, which has a softer and more flexible performance than is the case at higher engine speeds and at standstill of the engine. This is a considerable advantage for attaining good insulation of the vibrations of the engine at the idling speed. The relief valve 10 and the conduit 7 are designed so that when the relief valve 10 is closed, the conduit 7 between the outlet 8 and the outlet 9 is not blocked or narrowed in a manner that would significantly hinder the relative mobility of the liquid.

What is claimed is:

1. A hydraulically damped bearing having a longitudinal axis for supporting a piston engine comprising:
   a liquid-filled working chamber defined by a journal bearing, a bearing member, and an elastic spring element, said elastic spring element being connected between said bearing member and said journal bearing such that a predetermined displacement cross-section of said spring element is movable relative to said journal bearing;

a compensating chamber bounded at one end by a flexible inner wall;

a conduit having a cross-sectional flow area and a flow length, the majority of which length of the conduit being generally aligned with the longitudinal axis of the hydraulically damped bearing, said conduit further having a first outlet communicating with said working chamber, and a second outlet axially spaced from said first outlet communicating with said compensating chamber, said conduit co-operating with the expanding elasticity of the spring element such that when vibrations of an arbitrarily specified frequency are introduced into the bearing member, the liquid volume in the conduit attains a resonant movement; and a selectively operable relief valve mounted between said outlets in an inner side wall of said conduit, said relief valve communicating with said conduit and with one of said working and compensating chambers, and having an open position defining an effective length of the conduit that is shorter than the effective conduit length when the relief valve is in its closed position, said relief valve being positioned between said outlets such that the liquid volume contained in a linear section of the conduit defining the effective conduit length when the relief valve is open is set into a relative movement that vibrates essentially in phase with the bearing member when vibrations of a frequency corresponding to an idling speed of the piston engine are introduced into the bearing member, and the relative movement of the liquid volume has an amplitude that is greater than the amplitude of the bearing member, multiplied by the ratio of the displacement cross-section of the spring element and the cross-sectional flow area of the conduit.

2. The bearing according to claim 1, wherein the outlet that communicates with said one of said working and compensating chambers has a cross-sectional flow area that is narrower than the cross-sectional flow area of the conduit.

3. The bearing according to claim 1, wherein the cross-sectional flow area of the conduit is at least 100 $mm^2$.

4. The bearing according to claim 2, wherein the cross-sectional flow area of the conduit is at least 100 $mm^2$.

5. The bearing according to claim 1, wherein said relief valve has a cross-sectional flow area that is at least as large as the cross-sectional flow area of the conduit.

6. The bearing according to claim 2, wherein said relief valve has a cross-sectional flow area that is at least as large as the cross-sectional flow area of the conduit.

7. The bearing according to claim 3, wherein said relief valve has a cross-sectional flow area that is at least as large as the cross-sectional flow area of the conduit.

8. The bearing according to claim 4, wherein said relief valve has a cross-sectional flow area that is at least as large as the cross-sectional flow area of the conduit.

9. The bearing of claim 1 wherein said one of said working and compensating chambers is the compensating chamber.

10. The bearing of claim 2 wherein said one of said working and compensating chambers is the compensating chamber.

11. The bearing of claim 3 wherein said one of said working and compensating chambers is the compensating chamber.

12. The bearing of claim 4 wherein said one of said working and compensating chambers is the compensating chamber.

13. The bearing of claim 5 wherein said one of said working and compensating chambers is the compensating chamber.

14. The bearing of claim 6 wherein said one of said working and compensating chambers is the compensating chamber.

15. The bearing of claim 7 wherein said one of said working and compensating chambers is the compensating chamber.

16. The bearing of claim 8 wherein said one of said working and compensating chambers is said compensating chamber.

* * * * *